US008060242B2

(12) United States Patent
Wiersma et al.

(10) Patent No.: US 8,060,242 B2

(45) Date of Patent: Nov. 15, 2011

(54) SYSTEM, APPARATUSES, METHODS AND COMPUTER PROGRAM FOR PRODUCING A BATCH OF MAIL ITEMS AND PROVIDING AND GENERATING IDENTIFICATION CODES

(75) Inventors: Jelle Wiersma, Drachtster Compagnie (NL); Klaas Drenth, Drachten (NL)

(73) Assignee: Neopost S.A., Bagneux (FR)

( * ) Notice: Subject to any disclaimer, the term of this patent is extended or adjusted under 35 U.S.C. 154(b) by 771 days.

(21) Appl. No.: 11/324,210

(22) Filed: Dec. 30, 2005

(65) Prior Publication Data

US 2006/0167584 A1 Jul. 27, 2006

(30) Foreign Application Priority Data

Dec. 31, 2004 (NL) ..................................... 1027934

(51) Int. Cl.
*G06F 7/00* (2006.01)
*G06K 7/00* (2006.01)

(52) U.S. Cl. ......... 700/221; 209/584; 700/224; 700/222

(58) Field of Classification Search .................. 700/213, 700/214, 215, 216, 217, 219, 220, 221, 222, 700/223, 224, 225, 226; 209/584, 583

See application file for complete search history.

(56) References Cited

U.S. PATENT DOCUMENTS

| | | | | |
|---|---|---|---|---|
| 4,800,505 | A | 1/1989 | Axelrod et al. | 364/478 |
| 5,730,299 | A | 3/1998 | Helsley | 209/584 |
| 5,754,434 | A * | 5/1998 | Delfer et al. | 700/223 |
| 6,192,295 | B1 * | 2/2001 | Gunther | 700/225 |
| 6,324,442 | B2 * | 11/2001 | Gunther | 700/224 |
| 6,373,013 | B1 * | 4/2002 | Yamashita et al. | 209/584 |
| 2003/0085161 | A1 * | 5/2003 | Smith et al. | 209/584 |

FOREIGN PATENT DOCUMENTS

WO WO 2004/089646 A1 10/2004

* cited by examiner

*Primary Examiner* — Ramya Prakasam

(74) *Attorney, Agent, or Firm* — Sughrue Mion, PLLC

(57) ABSTRACT

A method and apparatus for producing a batch of mail items. A number of sheets are assembled to at least two documents, wherein at least two of the documents each contain at least two sheets. Each of the sheets in the batch is provided with a unique identification code unique to each sheet in the batch. The documents are assembled to one or more mail items. At least one unique identification code is read and the read unique identification codes are tested against a criterion. An error message is provided if the characteristic does not meet the criterion.

14 Claims, 2 Drawing Sheets

SYSTEM, APPARATUSES, METHODS AND COMPUTER PROGRAM FOR PRODUCING A BATCH OF MAIL ITEMS AND PROVIDING AND GENERATING IDENTIFICATION CODES

CROSS-REFERENCE TO RELATED APPLICATIONS

This application claims priority from Dutch Patent Application No. NL 1027934, filed on Dec. 31, 2004.

FIELD AND BACKGROUND OF THE INVENTION

The invention relates to a method and an apparatus for producing a batch of mail items. The invention further relates to a method and an apparatus for providing identification codes. Further, the invention relates to a method and apparatus for generating identification codes. The invention also relates to a system for processing sheets into mail items and to a computer program.

From U.S. Pat. No. 4,800,505, a system and method for preparing a batch of mail items to be sent are known. The system comprises an apparatus for marking each mail item with a selected identification code. To this end, an identification code is provided on the main document of the item. The identification codes are cyclically sequential and thus define the order in which the items are processed. The system further has a detector for detecting the identification code provided and means for retrieving parameter values coupled to the identification code from a database. The retrieved parameter values are then used by the system to process the items. If an identification code is detected which does not correspond to the order, the system is stopped and an operator is alerted, so that he can correct the error.

A disadvantage of the known system is that, while it is true that errors in the order of the mail items can be detected, other errors, such as errors in the mail items themselves, are not detected.

SUMMARY OF THE INVENTION

It is an object of the invention to provide a method for producing mail items, where errors in the mail items can be detected. To this end, the invention provides a method according to claim 1.

Errors in the items themselves can be detected because a unique identification code which is unique to each of the sheets can be read and is compared to a criterion. It can thus be determined whether the sheets in the mail item, or the sheets present in or more of the documents in a mail item, meet the criterion and thus the correctness of the content of a mail item or a document can be determined. Further, by means of the unique identification code, it can be determined which specific sheet or sheets in the batch of mail items do not meet the criterion, so that, if desired, adjustments only need to be made at the position of that sheet or the positions of those sheets in the batch.

Specific examples of embodiments of the invention are set forth in the claims.

Further details, effects and examples of the invention are discussed hereinbelow, inter alia with reference to an example shown in the drawing.

DETAILED DESCRIPTION

Figure 1:
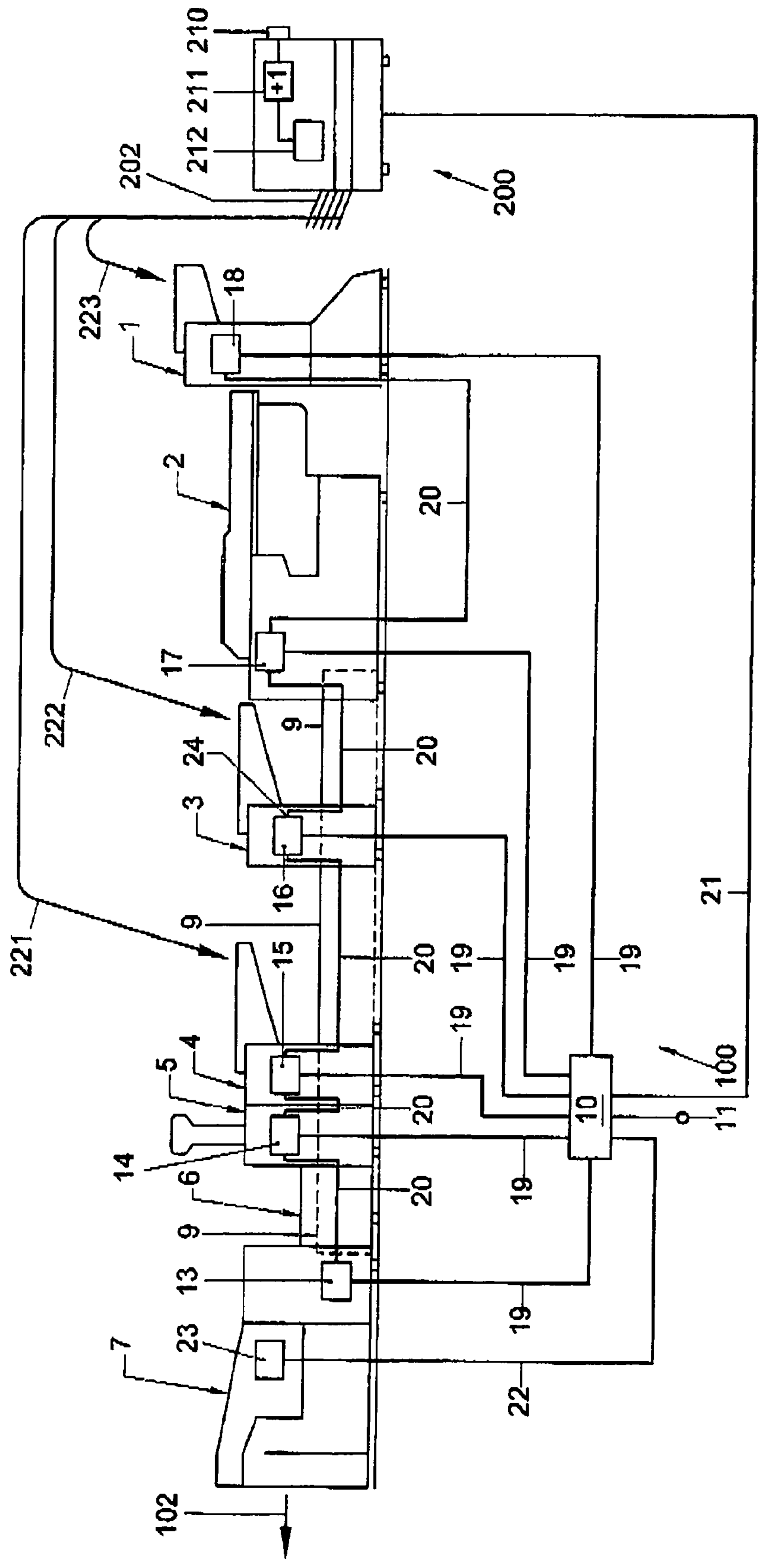
FIG. 1 schematically shows a first example of an embodiment of a system according to the invention, with an example of an embodiment of an apparatus for producing mail items in cooperation with an example of an embodiment of an apparatus for providing identification codes.

The system shown in FIG. 1 comprises an apparatus 100 for producing mail items 102. Upstream of the apparatus 100, an apparatus for providing identification codes is located, in this example a printer 200, with a marking unit for providing each sheet 202 in the batch of mail items 102 with a marking representing an identification code unique to that sheet.

The apparatus 100 can produce a batch of mail items 102 from a number of sheets 202. The apparatus 100 comprises a number of successive stations or processing modules 1-7. The stations or processing modules 1-7 may be of any suitable type to produce one or more mail items 102 from the loose sheets 202. As shown in FIG. 1, the processing modules 1-7 may, for instance, be arranged in an arrangement which, in succession, comprises: a feed station 1 for feeding loose sheets from the printing unit, a collating station 2, a first and a second insert feed station 3 and 4, respectively, a folding station 5, a transport unit 6 and an inserter station 7, For the mechanical components of the apparatus 100 shown, for instance stations can be used which substantially correspond in construction to stations of a product line marketed by applicant under the designation "SSI-92", or any other suitable type.

The feed station 1 is suitable for feeding the loose sheets 202 to the collating station 2. In the collating station 2, the sheets received from the feed station 1 may optionally be collated in stacks, which, for instance, each form a set of documents to be processed into a mail item 102. The sheets or stacks of sheets can then be fed along the insert feed stations 3 and 4, where inserts can be added if desired.

In the folding station 5, the sheets and inserts can be folded if desired. When the sheets and inserts have been collated in a stack upstream of the folding station 5, they are folded simultaneously, as a stack. The transport unit 6 comprises a transport track 9, to which the inserter station 7, the folding station 5, the insert feed stations 3, 4 and the collating station 2 are coupled. The folding station 5 and the insert feed stations 3, 4 have a larger width than the transport track 9 and have been placed from above over the transport track 9.

Thus, in this example, the feed station 1 with the collating station 2 can be seen as a module for assembling documents from two or more sheets, while the other stations 3-7 together can be considered a module for assembling one or more mail items 102 from the documents. Here, a document may contain only one single sheet, for instance when the document is a letter or otherwise. Also, a document may contain two or more sheets 202, for instance when the document is an advertising brochure or otherwise. A mail item 102 may contain one or more documents. For instance, it is possible that a mail item 102 contains only one single letter or that a mail item 102 contains a letter with one or more inserts. The size of a batch of mail items 102 is usually between a few thousands and several tens of thousands of mail items 102. However, the invention is not limited to such numbers and can already be applied advantageously to a batch with one or more mail items which in all contain two or more documents and where at least two of the documents each contain two or more sheets. With such small numbers, errors in the internal assembly of the documents and/or mail items 102 can be detected and corrected, whereas, in the known method, then it cannot be determined anymore which sheets belong to which documents or mail items 102 and so it cannot be determined whether there is an error, where it occurs, what the error is exactly and/or how the error can be solved.

It is to be noted that many other configurations of processing modules can be used and the invention is not limited to the example shown in FIG. 1. In particular, depending on the desired end product, processing modules may be removed or added. Further, the position of one or more processing modules 1-7 in the processing flow of the physical document may be changed. For instance, the insert feed stations 3 and 4 may be replaced with a different type. Also, the feed station 1 and the collating station 2 could be replaced with one single processing module, or other changes could be made in the configuration.

The example of an apparatus 100 shown in FIG. 1 further comprises a central control unit or processor 10 and a number of module control units 13-18 each belonging to one of the stations or processing modules 1-7. The module control units 13-18 are each connected with the central control unit 10 through a data communication connection 19. Via the data communication connections 19, the central control unit 10 can send an instruction to the module control units 18-18. On the basis of the instruction given, the respective module control unit 13-18 controls the equipment in the respective station 1-7. For instance, a module control unit 13-18 can switch on or switch off a check for double sheets, set the number of sheets to be dispensed per instruction or perform another operation.

The module control units 13-18 are further interconnected via a module communication connection 20. Via the module communication connection 20, adjacent module control units 13-18 can exchange information. For instance, the module control unit 18 in the feed station 1 can pass on to the module control unit 17 of the collating station 2 that the feed station 1 has executed an instruction and no further feed will follow, or other information can be exchanged between the module control units 13-18.

In FIG. 1, the apparatus for providing the unique identification code, in this example the printer 200, comprises a marking unit 212 for providing each sheet 202 in a batch of mail items with an identification code unique to that sheet. The apparatus 200 and the marking unit 212 may be of any suitable type. For instance, the apparatus, as shown in FIG. 1, may comprise a printer 200 or another suitable printing device which can provide the unique identification codes as well as other information on the sheets intended for the batch of mail items. It is also possible that the apparatus is only suitable for just providing the unique identification codes, on, for instance, already printed sheets intended for the batch of mail items.

In the example of FIG. 1, the marking unit 212 is a printing unit which can print a marking corresponding to the unique identification code on the physical sheets 202. However, it is also possible for the marking unit 212 to add layout instructions representing at least the unique identification code into a data file containing a field definition for at least one sheet to be printed in the batch of mail items, such as the layout of that sheet and the content thereof.

The unique identification code may be of any suitable type. Thus, the unique identification codes may have a mutual relation and may, for instance, be sequential. However, the unique identification codes need not necessarily have a mutual relation. As a unique identification code, an alphanumeric code unique to each sheet 202, for instance a number or letter combination, may be used, or a unique image. Of course, other unique identification codes may be used as well. The unique identification code may, for instance, be provided in the form of a barcode, an OMR code, an image or another suitable marking on the physical sheets 202. OMR (Optical Mark Reading) marks are marks where each presence of a mark in a reserved mark position has a predetermined meaning. Here, the marks are binary: in each reserved mark position, a mark is either present or absent. However, by combining a plurality of mark positions, the number of possibilities can be increased. For instance, with 16 marks, there are 65536 possibilities.

With a barcode, a number of (alpha)numeric marks are converted into marks having variable lengths, while, in many cases, the distance between the marks varies as well. In order to be able to read them, it is necessary to scan a mark as well as its size. This may be either one or two-dimensional. Therefore, for reading barcodes, more complex—and consequently more expensive—readers are necessary than for reading OMR codes.

In FIG. 1, the printer 200 for instance provides markings representing sequential unique identification codes. To this end, the printer 200 contains a counter 211 which is connected with a control input of the printing unit 212. Prior to printing the sheets of a batch, the reading of the counter 211 is set to an initial value by means of an input 210 connected with the counter 211, the reading of the counter 211 for instance being set to zero. After each printed sheet, the reading of the counter 211 is increased by one value. When all sheets 202 of a batch have been printed, the counter reading is brought to the original condition (e.g. set to zero again) by means of the input 210. In this example, the printing unit 212 provides a 16-bit barcode on the sheets 202, which represents a unique number for each sheet 202. In this example, the number of sheets 202 in the batch is smaller than $2^{16}$=65536, but of course the number of bits can be decreased or increased depending on the specific application and the number of sheets 202 in batches of mail items 102 expected therein. The reading of the counter 211 determines this unique number, so that successive sheets 202 are coupled to consecutive numbers. By the printer 200, the barcode corresponding to the unique number determined by the counter 211 is printed on the sheet.

In the example of FIG. 1, the sheets 202 intended for one mail item are printed directly after one another by the printer 200 and here, markings are provided representing consecutive numbers. The sheets of one document or one mail item are consequently coupled to a consecutive series of unique identification codes. Thus, it can simply be determined to which document or mail item 102 a series of sheets belongs and, in addition, deviations in the relative position of the sheets in the mail item can easily be determined. However, it is also possible for the printer 200 to operate in a different manner and to print, for instance, all sheets intended for main documents first and then the sheets for the first insert document, then those for the second insert document, etc.

In the example of FIG. 1, in addition to the markings representing the unique identification code, the printer 200 can also print other information on the sheets 202 of the batch of mail items 102 to be formed, such as for instance information which can be observed by people, such as images and text. Also, in this example, the printer 200 can print information on the sheets 202 which can be used by equipment for producing the mail items 102, or processing the mail items 102 further, such as OMR codes or barcodes or otherwise. This information may, for instance, contain processing or setting instructions for the respective equipment or other suitable information As shown in FIG. 1 by arrows 221-223, in use, the printed sheets 202 are fed from the printer 200 to the apparatus 100. In the example of FIG. 1, the printed sheets 202 of the batch of mail items 102 to be produced, with the markings provided thereon which are coupled to the unique identification code, are fed to the feed station 1 and the insert feed stations 3 and 4, respectively. Here, in this example, the sheets 202 in the batch belonging to the main documents of the mail items 102 are fed to the feed station 1 (arrow 223). The sheets 202 belonging to the insert documents are fed to the insert feed stations 3 and 4 (see arrows 221, 222).

The apparatus 100 for producing the mail items 102 has a detector 23 for reading the markings representing the unique identification codes provided on the sheets 202. The detector 23 is located downstream in the processing flow, thereby reducing the chance that, after reading the unique identification codes, errors still occur in the process which are not detected and, for instance, sheets are missing in the mail item 102. For instance, as shown in FIG. 1, the detector 23 may be located in the inserter station 7, preferably at a location where the envelope has not been closed yet, so that, with suitably chosen MOR codes, the identification code can still be read on an outermost of the sheets in the envelope while the documents are already in the envelope. Thus, a particularly reliable guarantee for correct insertion of a set of documents is obtained. With use of window envelopes, it is also possible to read the code on an outermost document in an envelope through the window. Another possible position for the detector is at the output of ready mail items. In that case, for instance, an identification code can be read from an envelope or, through the window of a window envelope, from an outermost document in the envelope.

It is noted that the detector 23 could also be located at a different position and that the apparatus 100 may also be provided with two or more detectors 23 located at different positions' in the apparatus 100. For instance, in the apparatus 100 shown in FIG. 1, instead of the detector 23 shown or in addition thereto, one or more detectors may be present at the feed station 1 and/or, if desired, the insert feed stations 3, 4, preferably in a position where it can, in each case, be detected whether a document with the correct code has been added to a set which is assembled.

By providing the feed stations 1, 3 and 4 with a detector, errors can be detected early. In addition, the stage after printing the sheets 202 and before assembling the printed sheets 202 to documents and/or mail items 102 is a stage in which relatively many errors occur. After that stage, the feed stations 1, 3 and 4 are the first parts of the apparatus 100 to receive the sheets 202, so that the errors can then be detected in a relatively short period after they have occurred. Conventionally, with large batches of mail items 102, the sheets 202 are printed at a different location than the location where the apparatus 100 for producing the mail items 102 is located. When collating the sheets 202 after printing, making the sheets 202 suitable for transport to the apparatus 100, feeding the sheets 202 into the apparatus 100 and/or during other intermediate stages, errors can then occur relatively easily. Thus, sheets 202 can be mixed up, so that, without further measures, one or more of the final mail items 102 will contain wrong sheets 202. It also happens relatively often that, for instance, a part, of the sheets 202 intended for the batch of mail items 102 is not transported to the apparatus 100 for producing the mail items 102 at all.

In the example of FIG. 1, the sensor 23 is connected with the central control unit 10 through a data connection 22. Through the data connection 22, the sensor 23 can send information about the read markings and the read unique identification codes thus represented. If, for instance, the unique identification code is provided in the form of an OMR code representing a number, the sensor 23 can send data about the OMR code itself, i.e. for instance the form of the OMR code is passed on to the central control unit 10 or it is, for instance, passed on whether the OMR code is present or not. It is also possible for the sensor 23 to distil other information from the read marking. Thus, the sensor 28 may be arranged to determine, from the read marking, the unique identification code represented thereby and to send the thus read unique identification code to the central control unit 10 through the connection 22.

In the example of FIG. 1, the printer 200 is communicatively connected with the central control unit 10 of the apparatus 100, through a suitable data connection 22, for instance an Ethernet connection or otherwise. Through the data connection 22, information about the unique identification codes coupled to the sheets 202, and, if desired, information about the markings provided on the sheets 202, is sent to the central control unit 10. If, for instance, the unique identification code is provided in the form of a barcode representing a number, the printer 200 can send data representing these numbers and optionally information about the barcode provided, such as at which location on the sheet is has been provided and which specific type of barcode has been provided.

The central control unit or processor 10 can test at least one of the read unique identification codes against a criterion. To this end, the central control unit 10 may, for instance, compare information about the unique identification codes provided sent by the printer 200 with the information about the read unique identification codes received from the sensor 23.

Also, the central control unit 10 may be arranged to determine whether the order of the read unique identification codes corresponds to the order in which the unique identification codes have been provided and which can therefore be expected. To this end, the central control unit 10 may, for instance, receive information about the orders from the printer 200 or, with sequential identification codes, the central control unit 10 may be arranged to determine, from the read unique identification codes, the original sequence and to compare it with the order of the read identification codes. The central control unit 10 can also be arranged to test the unique identification codes otherwise.

If the central control unit or processor 10 determines that the tested characteristics do not meet the respective criteria, an error message is fed to an output 11 of the central control unit 10. It is, for instance, possible for the central control unit 10 to send the error message to itself and, in response to the error message, to instruct the processing stations 1-7 to remove the sheet or the sheets in which the error occurs from the processing flow. The central control unit 10 may then, if desired, instruct the processing stations 1-7 to process the sheet or the sheets in which the error occurred again, and optionally send a message to the printer 200 to print that sheet or those sheets again. It is also possible for the error message to be designed to have a form which is observable by people, in response whereto one or more mail items in which the error occurs can be removed manually, for instance after dispensation by the inserter 7 or at another suitable moment. Also, the error message can be sent to a different apparatus and then be processed further. This is particularly suitable for uses in which printing the sheets and processing the sheets into mail items takes place at different locations. The error message can then be sent to different locations and the apparatuses present there can be controlled to correct the error.

It is also possible that the central control unit 10 also gives instructions to remove other sheets from the processing flow and to print and process them again, if desired. Thus, in a memory (which may be present in e.g. the central control unit 10), information may be stored which represents which unique identification codes are coupled to the sheets belonging to one document or one mail item 102. To this end, for each document or mail item in the batch of mail items, an optionally unique document code or mail item code coupled thereto can be determined which is stored in the memory. The document code or mail item code may then have been stored so as to be coupled to one or more unique identification codes. In that case, the central control unit 10 can retrieve, in the memory, which document code or mail item code is coupled to a read identification code and retrieve, from the memory, the unique identification codes further coupled to that same document code or mail item code. Then, the central control unit 10 can instruct the processing stations 1-7 to remove the sheets coupled to the retrieved unique identification codes from the processing flow. Optionally, a procedure may be provided for regenerating mail items during whose assembly an error has been detected.

In the example shown, the printer 200 operates batchwise, and prior to the apparatus 100 being operative, all sheets 202 intended for a batch of mail items 102 have been printed by the printer 200 and have each been provided with a unique identification code (and any other information). Then, if desired, one or more intermediate operations can be carried out with the sheets 202, such as for instance the assembly of a plurality of sheets 202 to a insert document, sorting the sheets 202, forming the sheets 202 in different stacks or otherwise. Then, the sheets 202 are fed to the respective (insert) feed stations 1, 3 and 4 and the apparatus 100 is put into operation.

However, it is also possible for the printer 200 to operate in a continuous process. For instance, with respect to the apparatus 100, the printer 200 may be positioned such that, when the apparatus 100 is operative, the printed sheets 202 are automatically fed to the apparatus 100 and are processed into documents and mail items 102 by the apparatus. Such an arrangement is, for instance, known from U.S. Pat. No. 5,283,752.

Figure 2:
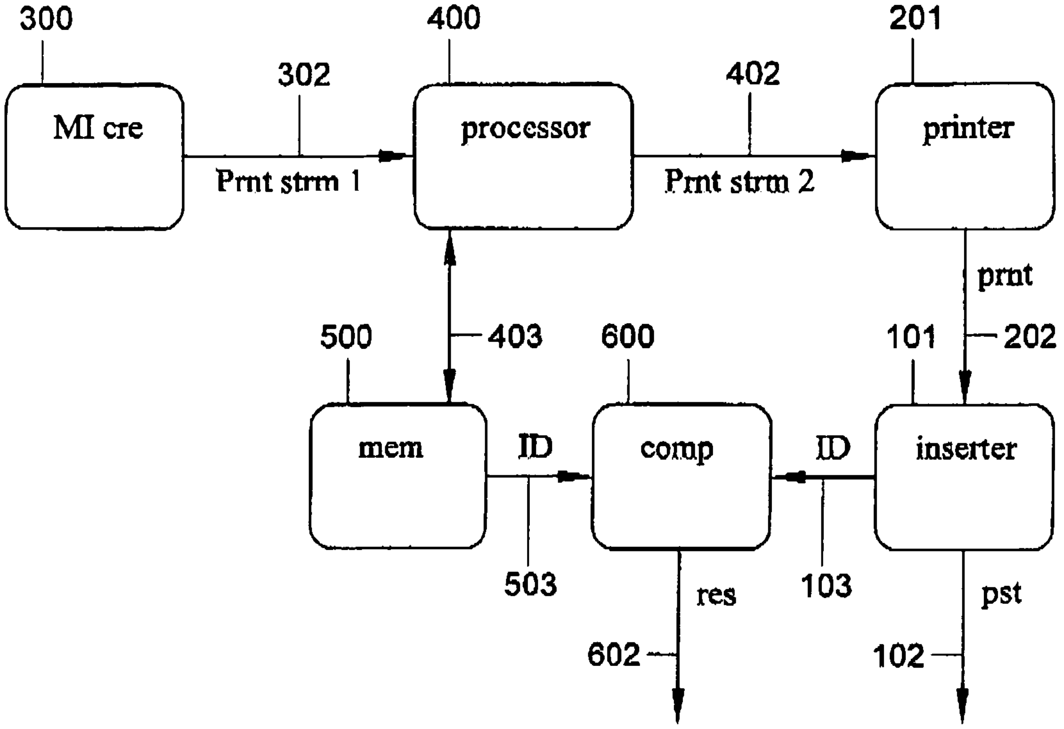
FIG. 2 schematically shows a second example of an embodiment of a system according to the invention.

FIG. 2 schematically shows a second example of a system according to the invention. In a processing flow direction, the system comprises, in succession, an electronic document generator (MI cre) 300, an electronic marking unit (processor) 400, a printer 201 and an inserter device 101. The inserter device 101 may be of any suitable type and may, for instance, be designed as the apparatus 100 in FIG. 1. The printer 201 may also be of any suitable type and may, for instance, comprise a conventional laser printer.

The electronic document generator 300 may, for instance, be a personal computer or another suitable, optionally programmable, device, such as a personal digital assistant (PDA). The electronic document generator 300 is arranged for providing a first data file, which defines at least the content of a document, for instance the text thereof. To this end, the electronic document generator 300 may, for instance, be provided with a word processing program whereby a user can input a document content into the electronic document generator 300 and can then store it in the form of a document file. In addition, the generator 300 may be provided with operating systems which are common for such devices, to which the word processing application is geared. Such operating systems are generally known and commercially available or at least licensable in different forms. The electronic document generator 300 may also be arranged to generate electronic mail and may, to that end, be provided with a so-called mail merge program.

In addition to the content of the document, the first data file may also contain other information. Thus, the first data file may define the layout of the document and, to this end, contain, for instance, information about the font in which the text is to be printed or other image-defining instructions. The first data file may also contain printing instructions, such as from which paper tray printing is to take place and the number of times printing is to take place.

In this example, the first data file is designed by the electronic document generator 300 in the form of a first dataflow 302 (prnt strm 1) of instructions suitable for the printer 201. For instance, the first data file may be a postscript file and may therefore contain both content and image-defining instructions. In this printer language, the image-defining instructions of a document comprise sets of image-defining instructions which can be carried out separately which each comprise image-defining instructions for printing an individual page. However, it is also possible to use other types of data files, such as a PLC format or a bitmap format.

The electronic document generator 300 sends the first dataflow 302 to the electronic marking unit 400. From the received dataflow, this unit determines which sheets are present in the batch of mail items and couples each of the sheets to a unique identification code. The electronic marking unit 400 then adds layout instructions representing at least the unique identification code of that sheet 202 to the field definition. With, for instance, a print stream in PCL format, this may be done by each time selecting a sheet by means of a Form Feed command. From the layout definition of the sheets, it is known where the x,y position is located where the unique identification code is to be placed. Then, the unique identification code is placed at this x,y position on the sheet with the aid of an x,y positioning command.

It is possible that, like in FIG. 2, the electronic marking unit 400 adds the layout instructions to a data file containing the field definition received from another unit. However, the field definition may also be generated by the electronic marking unit itself, for instance when the electronic marking unit 400 contains a printer driver, which can convert the data file 302 from the document generator 300 into a second data file readable by the printer 201. When the received data file contains layout instructions representing marks, like OMR codes or barcodes containing finishing instructions, these may, if desired, be replaced with the layout instructions representing at least the unique identification code. For instance, in a print stream in PCL format, it is possible to select each sheet by means of a Form Feed command. From the layout definition of the sheet, it is known where the x,y position is located where the marks are located. Then, at this x,y position on the sheet, this mark is removed with the aid of an x,y positioning command. It is also possible to remove the instruction itself in PCL code.

The file with the layout instructions generated by the electronic marking unit 400 is then sent to the printer 201, in this example in the form of a second dataflow 402 (Prnt strm 2). The printer 201 then prints all sheets according to the field definition. The printed sheets 202, these are also referred to as prints (prnt), are then fed from the printer to the inserter device 101. If desired, after printing and prior to feeding, intermediate operations can still be carried out with the sheets 202, such as attaching them to one another, cutting or otherwise. The inserter 101 then processes the sheets 202 into mail items 102.

FIG. 2 shows only one printer 201. However, it is also possible for the electronic marking unit 400 to be connected with a plurality of printers or other printing devices, which each print a part of the sheets. For instance, there may be a printer which prints main documents with personalized information, such as letters, while a printing device located at a different location prints insert documents, such as advertising brochures to be enclosed with the letter or otherwise.

The electronic marking unit 400 sends information about the coupled unique identification codes to a memory 500, with which the electronic marking unit 400 is connected through a communication connection 403. The received information is then stored in the memory 500. For instance, the electronic marking unit 400 can send unique numbers represented by the layout instructions to the memory 500. It is also possible that the electronic marking unit can send information about the specific document or mail item for which the sheets coupled to the unique identification codes are intended. For instance, the electronic marking unit 400 can send a document code or mail item code as well as information about which unique identification codes are coupled to the document code or mail item code.

The memory 500 is also communicatively connected with a comparator 600 through a first ID feed 503. The comparator 600 is also communicatively connected with the inserter device 101, through a second ID feed 103. The ID feeds 103,503 may be of any suitable type and may, for instance, be designed as Universal Serial Bus connections or other suitable connections.

Through the second ID feed 103, the comparator 600 of the inserter can receive information from a sensor, not shown in FIG. 2, which can read a marking provided on each printed sheet 202. This marking corresponds to the layout instructions and thus represents the unique identification code of a sheet. Through the first ID feed 503, the comparator 600 can retrieve identification information (ID) from the memory 500 about the unique identification codes provided. The comparator can then compare the information about the unique identification codes stored in the memory 500 with information about the read unique identification codes from the inserter device 101, for instance in a manner as explained hereinabove with reference to FIG. 1.

If desired, the comparator 600 can retrieve further information from the memory, such as one or more document identification codes or mail item identification codes coupled to the stored unique identification codes. In that case, the comparator can further be arranged to retrieve the unique identification codes coupled to the same document identification code or a mail item identification code from the memory and to compare these with at least a part of the read unique identification codes. Thus, the comparator can determine whether the correct sheets are present in the correct mail item or document and, when this is not the case, provide an error message, if desired.

The invention is not limited to the above-described examples. After reading the foregoing, several variants will be readily apparent to a skilled person. It will, for instance, be clear that the central control unit 10 and the module control units 13-18 may be designed in any suitable manner. The control units may, for instance, be designed as a programmable device, such as a computer or otherwise, which is provided with computer software with which one or more of the above-described functions can be carried out. The invention may also be embodied in a computer program which, when loaded into a programmable device, makes this device suitable for carrying out a method according to the invention. Here, the computer program may be provided on a carrier, such as a data connection, an optical or magnetic data carrier or otherwise. It is further possible that the components of a system or device according to the invention are at one location. It is also possible that the components are distributed among different locations. For instance, the sheets may be printed at a printing office or be printed by different printing devices, and then be sent to a processing device located at a different location.

The invention claimed is:

1. A method for producing a batch of mail items from a plurality of sheets, said batch of mail items, comprising one or more mail items, which in all contain two or more documents and where at least two of the documents each contain two or more sheets, in which method a system comprising a printer for printing sheets, a module for assembling documents from one or more sheets, a module for assembling one or more mail items from the documents, is operated such that said system performs the steps of:

printing the sheets intended for one mail item in an original sequence directly after one another by the printer, during which printing on each sheet intended for the batch of mail items a marking representing an identification code unique to that sheet is printed by the printer;

providing and storing information about the original sequence in which the printed markings representing the unique identification codes have been printed;

transporting the printed sheets from the printer to the module for assembling documents from one or more sheets;

assembling the sheets to documents and/or mail items, at least a plurality of said documents and/or mail items comprising a plurality of successive ones of said printed sheets;

before the step of assembling the sheets to documents and/or mail items, reading the markings representing the unique identification codes printed on the sheets by a detector forming part of the system, and providing and storing information about the sequence in which the markings have been read by the detector;

comparing the stored information about the original sequence in which the markings representing the unique identification codes have been printed by the printer with the stored information about the sequence in which markings representing the unique identification codes have been read by the detector, determining whether the sequence in which the markings representing the unique identification codes have been read corresponds to the original sequence in which the markings representing the unique identification codes have been printed; and providing an error message if it is determined that the sequence in which the markings representing the unique identification codes have been read does not corresponds to the original sequence in which the markings representing the unique identification codes have been printed.

2. A method according to claim 1, wherein, data representing the sequence of the unique identification codes are retrieved from a memory.

3. A method according to claim 2, further comprising:

retrieving, from the memory, one or more document identification codes or mail item identification codes coupled to the retrieved unique identification codes.

4. A method according to claim 2 comprising the step of determining for each document or mail item in the batch of mail items a unique document code or mail item code coupled thereto, and storing it in the memory.

5. A method according to claim 1, which method further comprises, if an error message is provided: removing the sheet corresponding to the unique identification code and at least one sheet coupled to that sheet from a processing flow.

6. A method according to claim 5, wherein the sheets belonging to one document or mail item are attached to one another.

7. A method according to claim 6, wherein, in a memory, the unique identification codes of the sheets belonging to one document or one mail item are stored so as to be coupled to a document code or a mail item code and wherein the unique identification codes coupled to a same document code or mail item code are retrieved from the memory and the sheets corresponding to the retrieved unique identification codes are removed from the processing flow.

8. A method according to claim 2, which method further comprises the step of, if an error message has been provided, determining in which sheet or sheets an error has occurred, and removing these sheet or sheets from a processing flow.

9. A method according to claim 1, wherein assembling the documents comprises: providing the markings on the sheets.

10. A data carrier provided with data representing a computer program comprising a program code for carrying out steps of a method according to claim 1 when the computer program is carried out by a programmable device.

11. A method according to claim 1, wherein the sequential identification codes constitute a series of consecutive identification codes.

12. A method according to claim , comprising the step of storing in a memory information representing which printed markings representing a unique identification codes are coupled to the sheets belonging to one document or one mail item.

13. An apparatus for producing a batch of mail items from a plurality of sheets, said batch of mail items comprising one or more mail items, which in all contain two or more documents and where at least two of the documents each contain two or more sheets, said apparatus comprising:
- a printer for printing sheets, said printer printing the sheets intended for one mail item in an original sequence directly after one another, and printing on each sheet intended for the batch of mail items a marking representing an identification code unique to that sheet;
- a module for assembling documents from one or more sheets;
- a module for assembling one or more mail items from the documents, at least a plurality of said documents and/or mail items comprising a plurality of successive ones of said printed sheets;
- a memory for storing information about the original sequence in which the printed markings representing the unique identification codes have been printed;
- a feed station for transporting the printed sheets from the printer to the module for assembling documents from one or more sheets;
- a detector for reading the markings representing the unique identification codes printed on the sheets, and for providing information about the sequence in which the markings have been read by the detector;
- the memory for storing information about the sequence in which the markings have been read by the detector;
- a processor communicatively connected to the detector, the memory and to an error message output provider, for:
- comparing the stored information about the original sequence in which the markings representing the unique identification codes have been printed by the printer with the stored information about the sequence in which markings representing the unique identification codes have been read by the detector;
- determining whether the sequence in which the markings representing the unique identification codes have been read corresponds to the original sequence in which the markings representing the unique identification codes have been printed; and
- providing an error message if it is determined that the sequence in which the markings representing the unique identification codes have been read does not corresponds to the original sequence in which the markings representing the unique identification codes have been printed.

14. An apparatus according to claim 13, wherein the sequential identification codes constitute a series of consecutive identification codes.

* * * * *